3,462,406
PROCESS FOR THE POLYMERIZATION OF BUTADIENE TO POLYBUTADIENE HAVING SUBSTANTIALLY 1,4 CIS STRUCTURE
Giulio Natta and Antonio Carbonaro, Milan, Alberto Lionetti, Naples, and Lido Porri, Milan, Italy, assignors to Montecatini Edison S.p.A., Milan, Italy, a corporation of Italy
No Drawing. Filed Apr. 6, 1966, Ser. No. 540,523
Claims priority, application Italy, Apr. 7, 1965, 7,662/65
Int. Cl. C08d 1/14, 3/08
U.S. Cl. 260—94.3                                13 Claims

ABSTRACT OF THE DISCLOSURE

Butadiene is polymerized by means of a catalyst prepared from cobalt compounds and the reaction product between, e.g., dialkyl aluminum halide and water, using, as polymerization medium, cis butene-2 or mixtures of butenes, e.g., mixtures of cis butene-2 and butene-1 in which the cis butene-1 content is at least 20% by weight and the butene-1 content is less than 20% by weight. The mixtures may also contain butane, in which case the sum of butene-1 and butane is less than 20%. In the polybutadiene obtained at least 95% of the units derived from the monomer have cis-1,4 structure. The polymer is substantially gel-free.

---

The present invention is concerned with a process for the polymerization of butadiene to polybutadiene consisting of macromolecules having at least 95% of 1,4 cis units.

In preceding applications assigned to the same assignee, the preparation has been described of cis 1,4 polybutadiene by means of soluble catalysts based on cobalt compounds, prepared by reaction between an aluminum dialkylmonohalide and a hydrocarbon soluble cobalt compound, such as cobalt diacetylacetonate, $CoCl_2$-pyridine complex, cobalt salts of organic acids, etc. Such catalysts are commonly prepared and used in the presence of a hydrocarbon solvent consisting of aromatic hydrocarbons, especially benzene, or of mixtures of aliphatic and aromatic hydrocarbons containing at least 50% of aromatic hydrocarbons. Aliphatic hydrocarbons, such as n-heptane, are usually not employed as reaction medium since they lead to the formation of polymers having a low cis content, a low molecular weight, and very bad characteristics of workability.

The polymerization of butadiene by means of catalysts obtained from cobalt compounds and aluminum organic compounds containing oxygen bridges has recently been described. See Journal of Polymer Science, part C, No. 4, page 387 (1964). These catalysts, however, are prepared employing the distilled fraction of the product obtained by a reacting an aluminum dialkylhalide with water and are used in the presence of aromatic hydrocarbons. Under the described conditions, no advantage with respect to the previously known processes is obtained. In fact, at equal reaction times, somewhat lower conversions are obtained. Such a catalyst gives unsatisfactory results when employed in the presence of aliphatic solvents: a polybutadiene is in fact obtained having low molecular weight and a low content of 1,4 cis units.

It has now been found according to the present invention, that catalysts obtained from a Co compound and the non-distillable fraction of the product obtained reacting an aluminum alkyl or aryl monochloride and $H_2O$ may surprisingly be used with advantageous results, even in the presence of reaction media exclusively consisting of alphatic hydrocarbons. The same results are obtained using the crude product of the above mentioned reaction between an aluminum-dialkylchloride and $H_2O$. It has been found that the polymerization may be carried out in the presence of particular unsaturated hydrocarbons such as cis butene-2 or mixtures of butenes. This latter circumstance could by no means be predicted since other alphatic hydrocarbons containing internal double bonds, such as cyclooctene and cyclooctadiene, hinder the polymerization.

According to the present invention, a polymerization medium is used consisting of cis butene-2 or of mixture of butenes. Also butane may optionally be present, containing at least 20% of cis butene-2 and less than 20% of butene-1 and/or butane. The sum of butene-1 and butane must be below 20%.

By operating in the presence of aliphatic solvents, according to the present invention, polybutadienes free of gel, having excellent characteristics of workability and consisting of macromolecules having at least 95% of 1,4 cis units are obtained. The polybutadienes always have a very high molecular weight, as it is proved by the fact that they have an intrinsic viscosity, at least equal to, or higher than 1.5.

As catalyst components, cobalt compounds or complexes are employed, preferably soluble in the aliphatic solvents used for the polymerization, such as, triacetylacetonate, tribenzoylacetonate, 2-ethylhexanoate, cobalt stearate-pyridine, and carbonyl complexes. Cobalt compounds which are insoluble in the aliphatic solvents may also be used, such as dithiocarbamate, and xanthogenates and complexes of $CoCl_2$ with organic bases, such as pyridine; and nitrogen containing compounds in general, such as with various aliphatic amines, diamines, acetamide, dimethylformamide, aniline, and with other aromatic amines, phenyl hydrazine, aldoximines and ketoximes and compounds such as pyrrole, morpholine, etc. One may also use complexes obtained through combinations of cobalt salts with alcohols, ketones, nitriles, phosphines, arsines, stibines, alkyl or alkylaryl phosphates or phosphites.

For the preparation of the catalyst, the above mentioned cobalt compounds are reacted with aluminum organic compounds consisting of the reaction product obtained from a compound of the general formula $AlR'R''Cl$, wherein $R'$ and $R''$ are alkyl, cycloalkyl or aryl groups; and $H_2O$, with $Al/H_2O$ molar ratio equal to about 2:1. The reaction between $H_2O$ and the aluminum compound may be carried out as described in the previously mentioned article in The Journal of Polymer Science, by adding the aluminum dialkylchloride into a benzene solution of water, or by means of other techniques, for instance, by bubbling a moist inert gas into the aluminum compound. The reaction product, employed as a catalyst component (either the crude reaction product or the non distillable fraction thereof), is here called, for convenience, the conventional name of chloroalkyl-(or aryl-) di-alumino-oxane. This product is much more stable, and less sensitive to air and moisture, than the aluminum-organic compounds commonly used as catalyst components; its use offers, therefore, from the practical point of view, undoubted advantages.

Generally, speaking, the reaction between the cobalt compound and the aluminum compound is carried out in the same hydrocarbon which is used as polymerization medium. This reaction, however, may also be carried out in the absence of solvents, or in the presence of a small amount of hydrocarbon solvent. Generally speaking, the catalyst employed according to the present invention is very soluble in hydrocarbon solvents in general, more particularly, in those aliphatic solvents which are used as polymerization medium. Its solubility is remarkably higher than that of the known catalysts, obtained by starting from aluminum alkylhalides and cobalt compounds.

The molar ratio between aluminum compound and cobalt compound in the catalysts is not critical. It may vary between 5:1 and 1000:1, preferably between 50:1 and 200:1.

The concentration of the catalyst in the polymerization medium, expressed as concentration of the cobalt compound, is always very low and may vary between 0.005 and 0.5 millimol per liter of solvent. The yield of polymer per weight unit of employed catalyst is, therefore, always very high.

The polymerization according to the present invention may be carried out at temperatures between $-30$ and $+80°$ C., preferably between $-5$ and $+30°$ C.

If desired, molecular weight regulators, per se known, such as ethylene or cyclooctadiene 1,5, etc., may be used.

At the end of the polymerization, the catalyst may be destroyed with methanol or water. It is sufficient to bring the raw polymerization mixture to room temperature in order to d istill most of the $C_4$ hydrocarbon content (butenes and butane). The residue of the solvent is then removed from the polymer with per se known methods, e.g. by stripping with steam or by heating under vacuum.

As previously indicated, the polymerization according to the present invention occurs in a polymerization medium consisting of aliphatic hydrocarbons. As reaction medium, mixtures of butenes, in particular, mixtures obtained by dehydrogenation of butenes, or of n-butane are used.

By employing as solvent, only n-butane or only butene-1, partially gellified polybutadienes are obtained. Polybutadienes free of gels, however, are obtained by employing as reaction medium cis butene-2, or mixtures of cis butene-2 with butene-1 and/or butane, provided that the content of cis butene-2 is of at least 20%, and that the sum of butene-1 and butane is lower than 20%.

In the dehydrogenation of butenes ($C_4$ fraction containing butene-1, cis butene-2 and trans butene-2) mixtures containing 25–30% of butadiene are obtained, which can directly be used as monomer feed in the polymerization with the above mentioned catalysts. In general, however, the butadiene content in the polymerization mixture may range between 5 and 50%.

Also, in the two-stage dehydrogenation of butane, a mixture of butane and butenes is obtained in the first stage. The butenes are then separted from butane, and dehydrogenated to butadiene in the second stage (see, for instance, Kirk & Othmer-Encyclopedia of Chemical Technology III—794). The mixture of butadiene and butenes obtained in the second stage may be directly fed into the reaction zone and brought into contact with the above mentioned catalysts, to give 1,4 cis polybutadiene.

Butadiene may also be obtained by a single-stage dehydrogenation of butane. Mixtures of butadiene, butenes and butane are thus obtained. These mixtures, after suitable correction of their composition, if necessary, may be fed into the polymerization reactor.

As is known, about 50% of the butadiene produced in the world, is presently obtained by catalytic dehydrogenation of butene, while a great amount is also obtained by dehydrogenation of butane. The process of the present invention advantageously allows the use of the raw mixtures obtained by these dehydrogenation reactions, as monomer feed and, at the same time, reaction medium feed. Its practical importance is therefore obvious. Furthermore, there is no need to separate butadiene from the other members of the $C_4$ fractions obtained from the dehydrogenation reactions prior to polymerization.

The invention will now be better illustrated by the following examples, which are given to further explain the invention, and not to limit its scope.

Example 1

In this example, and in the other examples, all operations are carried out under a dry nitrogen atmosphere.

75 cm.$^3$ of cis butene-2 and 25 cm.$^3$ of butadiene are condensed in a 100 cm.$^3$ test tube, cooled to $-20°$ C., provided with a lateral cock and a cone shaped, emeried, upper opening. 0.0025 of cobalt triacetylacetonate and, after this compound is completely dissolved, 0.2 g. of the metallorganic compound chloro-ethyl-dialluminooxane are added to this mixture. The test tube is then immediately immersed in a bath at 0° C.

After 15 minutes, a remarkably high viscosity is reached. The polymer is coagulated in methanol (100 cm.$^3$) and 7.3 g. of polymer are obtained. IR analysis reveals a content of 97.7% of cis 1,4 units in the polybutadiene. The intrinsic viscosity, determined in toluene at 30° C., was found to be 3.76 (100 cm.$^3$/g.).

Example 2

30 cm.$^3$ of cis butene-2 and 10 cm.$^3$ of butadiene are condensed at $-20°$ C. in a large test tube having the volume of 50 cm.$^3$, under conditions analogous to those of Example 1. 0.0012 g. of cobalt triacetylacetonate and 0.1 cm.$^3$ of $Al(C_2H_5)_2Cl$ are then dissolved into the mixture. The resulting solution is kept at 0° C. for 15 hours.

A small amount of polymer is formed which precipitates in the polymerization medium. The dried product (less than 0.1 g.) has a powdery appearance and is insoluble in organic solvents.

Example 3

The run was carried out exactly as described in Example 1, except that cis butene-2 was replaced with butene-1. The polymerization is carried out for 60 minutes.

The polymer is coagulated and 13.5 g. are obtained. The polymer is completely gellified and is insoluble in the usual organic solvents, like benzene, $CS_2$, $CCl_4$ etc.

Example 4

In this run, the polymerization solvent is formed by a mixture of trans butene-2 and cis butene-2.

In a large glass test tube having a volume of 100 cm.$^3$ there are condensed at $-20°$ C.:

| | Cm.$^3$ |
|---|---|
| Trans butene-2 | 50 |
| Cis butene-2 | 25 |
| Butadiene | 25 |

After having dissolved into this mixture, 3 mg. of cobalt triacetylacetonate, there is added the organometallic compound, chloro-ethyl-diallumino-oxane in the amount of 0.2 cm.$^3$. The polymerization, which is carried out at 10° C., goes on for 20 minutes.

The polymer is isolated through coagulation in 100 cm.$^3$ of methanol. 10.7 g. are obtained. The 1,4 cis units are 96.7%, by IR analysis. The intrinsic viscosity in toluene at 30° C. is 1.51 (100 cm.$^3$/g.).

Example 5

As polymerization solvent, a mixture of butenes is used, having the following composition:

| | Cm.$^3$ |
|---|---|
| Trans butene-2 | 20 |
| Cis butene-2 | 10 |
| Butene-1 | 10 |

Into this mixture, which is cooled to $-20°$ C., there are dissolved:

| | G. |
|---|---|
| Cobalt triacetylacetonate | 0.0015 |
| Butadiene | 6.5 |
| Chloro-ethyl-dialluminooxane | 0.1 |

The resulting mixture is immediately brought to 0° C. and is kept at this temperature for 2 hours.

The polymer obtained, 4.5 g., has a cis content of 96.5%, and the intrinsic viscosity is 1.55 (100 cm.³/g.) as determined at 30° C. in toluene.

Example 6

The run is carried out as described in Example 5, except that butene-1 is replaced by the same amount of butane, and the polymerization time is complete after about 90 minutes.

The polymer obtained amounts to 5.8 g. IR analysis shows 97.2% of cis, 1,4 units. The intrinsic viscosity was found to be 1.81 (100 cm.³/g.) at 30° C. n toluene.

Examples 7–13

A series of runs was carried out all of which were carried out under the conditions described in Example 1, but cobalt triacetylacetonate is replaced by equi-molar amounts of cobalt tribenzoylacetonate, cobalt stearate complexed with pyridine, dicobaltoctacarbonyl, cobalt diacetylacetonate, and $CoCl_2$-2 pyridine.

The results, obtained, as far as the characteristics of the polymers are concerned, are analogous to those reported in Example 1.

Examples 14–15

50 cm.³ of anhydrous benzene and 10 cm.³ of $$Al(C_2H_5)_2Cl$$

are introduced into a three-necked flask provided with a stirrer. A solution of 0.73 g. of $H_2O$ in 1700 cm.³ of benzene is then slowly introduced into the flask while stirring. The resulting solution is stirred at room temperature during two hours. Benzene is then removed by distillation under a reduced pressure of 20 mm. Hg.

The product remaining in the flask, which is a dense colourless liquid, is distilled under a reduced pressure of $10^{-3}$ mm. Hg at 38–40° C. About 1 cm.³ of a liquid product is collected. The residue is undistillable.

Two polymerization runs are then carried out using as catalyst forming component the undistillable product (run A) and the distilled fraction (run B), respectively.

The following reagents are used:

| | |
|---|---:|
| Butene-2 cis _____ cm.³ _ _ | 75 |
| Anhydrous butadiene _____ g _ _ | 16 |
| Co-2 ethyl hexanoate _____ g _ _ | 0.0025 |
| Al-organic product _____ cm.³ _ _ | 0.2 |

The results of the two polymerization runs which are carried out at 0° C. are reported in the table herebelow.

| Run | Polymer obtained after 15′ (g.) | [η] | I.R. analysis | | |
|---|---|---|---|---|---|
| | | | 1.4 cis percent | 1.4 trans percent | 1.2 percent |
| A | 7.1 | 3.8 | 98 | 0.8 | 1.2 |
| B | 0.6 | 0.15 | 88.6 | 2.1 | 9.3 |

As will be apparent, various changes in details may be made in the practice of this invention without departing from the spirit thereof. It is intended, therefore, to include in the scope of the appended claims, all such modifications in details as will be obvious to those skilled in the art from the description and working examples given herein.

What is claimed is:

1. A process for polymerizing butadiene to high molecular weight, substantially gel-free polybutadiene consisting essentially of macromolecules in which at least 95% of the units have cis-1,4 structure, which process comprises contacting butadiene, in an aliphatic reaction medium containing at least 20% of cis butene-2 and not more than 20% of a compound selected from the group consisting of butene-1, butane, and mixtures thereof, with a catalyst consisting essentially of the product obtained by mixing (1) cobalt compounds and (2) a substance selected from the group consisting of (A) the crude product obtained by reacting $H_2O$ and a compound of the general formula $AlR'R''Cl$ wherein R' and R'' are selected from the group consisting of alkyl, cycloalkyl and alkylaryl radicals, in an $Al/H_2O$ molar ratio of about 2:1; and (B) the portion of said crude product which is non-distillable under a reduced pressure of $10^{-3}$ mm. Hg at 38 to 40° C.

2. A process according to claim 1, in which the reaction medium consists essentially of a mixture of cis butene-2 and substances selected from the group consisting of butenes, butane, and mixtures thereof.

3. A process according to claim 1, characterized in that the polymerization is carried out by using, as butadiene monomer and reaction medium, the $C_4$ fraction, obtained by dehydrogenation of butenes.

4. A process according to claim 1, characterized in that the polymerization is carried out by using, as butadiene monomer and reaction medium, the mixture obtained by single-stage dehydrogenation of butane to butadiene.

5. A process according to claim 3, in which the butenes dehydrogenated are obtained from dehydrogenation of butane.

6. A process according to claim 1, in which the cobalt compound is soluble in the reaction medium.

7. A process according to claim 6, in which the cobalt compound is selected from the group consisting of cobalt triacetylacetonate, cobalt diacetylacetonate, cobalt tribenzoylacetonate, cobalt 2-ethylhexanoate, cobalt stearate-pyridine, and cobalt carbonyl complexes.

8. A process according to claim 6, in which the cobalt compound is cobalt triacetylacetonate.

9. A process according to claim 1, in which the cobalt compound is insoluble in the reaction medium.

10. A process according to claim 8, in which the cobalt compound is a complex of $CoCl_2$ with an organic base.

11. A process according to claim 1, in which the molar ratio between catalyst component 2 and catalyst component 1 is between 5:1 and 1000:1.

12. A process according to claim 1, in which the concentration of cobalt compound is from 0.005 to 0.5 millimol per liter of solvent.

13. A process according to claim 1, in which the polymerization temperature is from −30° to +80° C.

References Cited

UNITED STATES PATENTS

| 3,066,128 | 11/1962 | Youngman | 260—94.3 |
| 3,203,945 | 8/1965 | Zelinski | 260—94.3 |

FOREIGN PATENTS 884,071  12/1961  Great Britain.

OTHER REFERENCES

Journal of Polymer Science, Longiave et al., pp. 387–398 (1964).

JAMES A. SEIDLECK, Primary Examiner

R. A. GAITHER, Assistant Examiner

U.S. Cl. X.R.

252—426, 431; 260—85.3